US 008869866B2

(12) United States Patent
Bauman et al.

(10) Patent No.: US 8,869,866 B2
(45) Date of Patent: Oct. 28, 2014

(54) TILED DISPLAY ROTATIONAL ASSEMBLY (75) Inventors: Alexander Kyle Bauman, Elmira (CA); Bryan Russell Hemphill, Waterloo (CA); Daniel Robert Adema, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 159 days.

(21) Appl. No.: 13/447,235

(22) Filed: Apr. 15, 2012

(65) Prior Publication Data

US 2013/0269882 A1    Oct. 17, 2013

(51) Int. Cl.
*E05D 15/00* (2006.01)

(52) U.S. Cl.
USPC .............. 160/135; 160/218; 160/181; 40/605

(58) Field of Classification Search
USPC ............ 160/135, 181, 220, 218; 40/605, 610; 211/169, 198; 16/265, 266
See application file for complete search history.

(56) References Cited

U.S. PATENT DOCUMENTS

| | | | | |
|---|---|---|---|---|
| 4,785,565 | A | * | 11/1988 | Kuffner .......................... 40/605 |
| 6,112,445 | A | * | 9/2000 | Feeney ........................... 40/747 |
| 6,550,521 | B1 | | 4/2003 | McNabb |
| 6,557,282 | B1 | * | 5/2003 | Cleaver .......................... 40/541 |
| 6,651,366 | B1 | * | 11/2003 | Duncan .......................... 40/605 |
| 7,753,100 | B2 | * | 7/2010 | Luomanen et al. ........... 160/218 |
| 8,172,191 | B1 | * | 5/2012 | Zimbalatti ............... 248/346.01 |
| 2010/0101738 | A1 | * | 4/2010 | Luomanen et al. ........... 160/181 |
| 2013/0269882 | A1 | * | 10/2013 | Bauman et al. ............... 160/135 |

* cited by examiner

*Primary Examiner* — Blair M. Johnson
(74) *Attorney, Agent, or Firm* — Perry + Currier Inc.

(57) ABSTRACT

A tiled display rotational assembly is provided. The system uses panels connected by hinges, the panels configured to mount at least one display on each panel. A first panel has an extending hinge portion with a first bearing surface attached to an edge while a second panel has a receiving hinge portion with a second bearing surface attached to an edge. When the extending hinge portion is inserted into the receiving hinge portion the extending hinge portion and the receiving hinge portion together define an axis of rotation about which the panels may rotate.

7 Claims, 8 Drawing Sheets

TILED DISPLAY ROTATIONAL ASSEMBLY

BACKGROUND OF THE INVENTION

1. Field of the Invention

The present invention is directed to a tiled display rotational assembly. More specifically, it is directed to a system for more easily mounting and assembling a tiled display.

2. Description of the Related Art

A tiled display is a composite display comprised of several smaller displays that, once arranged and aligned properly, can be controlled as one large display, as an array of separate displays, or some combination of both. When a tiled display is being used as one large display, having even a single individual display out of alignment can ruin the image. Typically, installing a tiled display is difficult and precise work since each individual display "tile" in the tiled display must be stacked and/or aligned separately.

For example, U.S. Pat. No. 6,550,521 discloses a system for arranging displays into an array using a frame into which each display must be inserted individually and adjusted laboriously before the tiled display is ready for use. The on-site installation of such as tiled display is difficult and time-consuming.

It would be advantageous to have a system for mounting a tiled display that is easier and faster than currently provided for in the prior art. It would be especially advantageous to have a system for mounting a tiled display that allows the mounting and alignment of more than one individual display simultaneously.

SUMMARY OF THE INVENTION

It is an aspect of the present invention to provide a system for easily mounting and assembling a tiled display.

It is another aspect of the present invention to provide a means by which multiple displays may be mounted and aligned simultaneously.

The above aspects can be attained by a system that uses panels connected by hinges, the panels configured to mount at least one display on each panel. A first panel has an extending hinge portion with a first bearing surface attached to an edge while a second panel has a receiving hinge portion with a second bearing surface attached to an edge. When the extending hinge portion is inserted into the receiving hinge portion the extending hinge portion and the receiving hinge portion together define an axis of rotation about which the panels may rotate.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
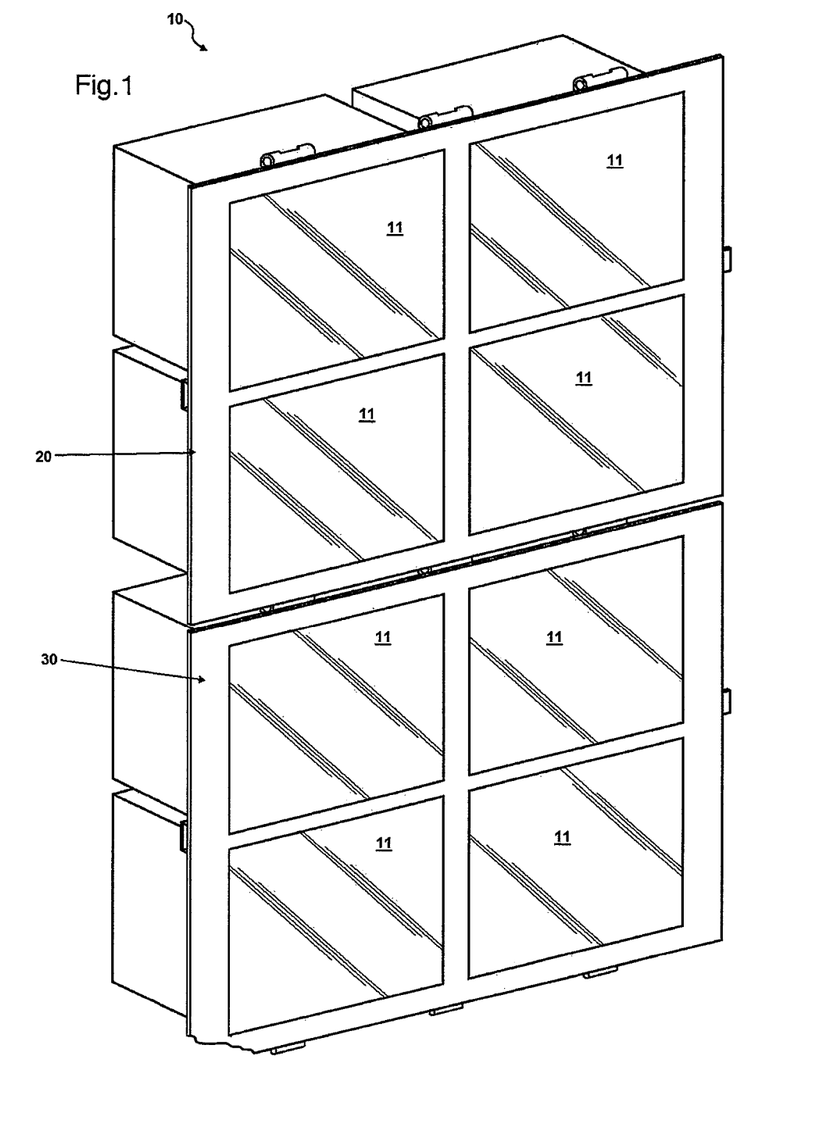
FIG. 1 shows a perspective view of the front of a tiled display mounting system with displays in place.

FIG. 1 is a perspective view of the front of a tiled display mounting system 10 with displays 11 in place. The tiled display mounting system 10 is shown assembled and ready for use. More specifically, first panel 20 and second panel 30 are linked together in the locked position (explained below with reference to FIGS. 3-7).

Each of panels 20, 30, as shown, is configured to mount a 2×2 array of displays 11. Those skilled in the art will recognize that panels 20, 30 may be configured to mount an array of displays 11 of any convenient dimensions, and that manufacturing the panels 20, 30 to a predetermined configuration and pre-mounting at least some of the individual displays 11, the difficulty of aligning individual displays 11 on-site is avoided and the overall set-up time is also shortened.

Figure 2:
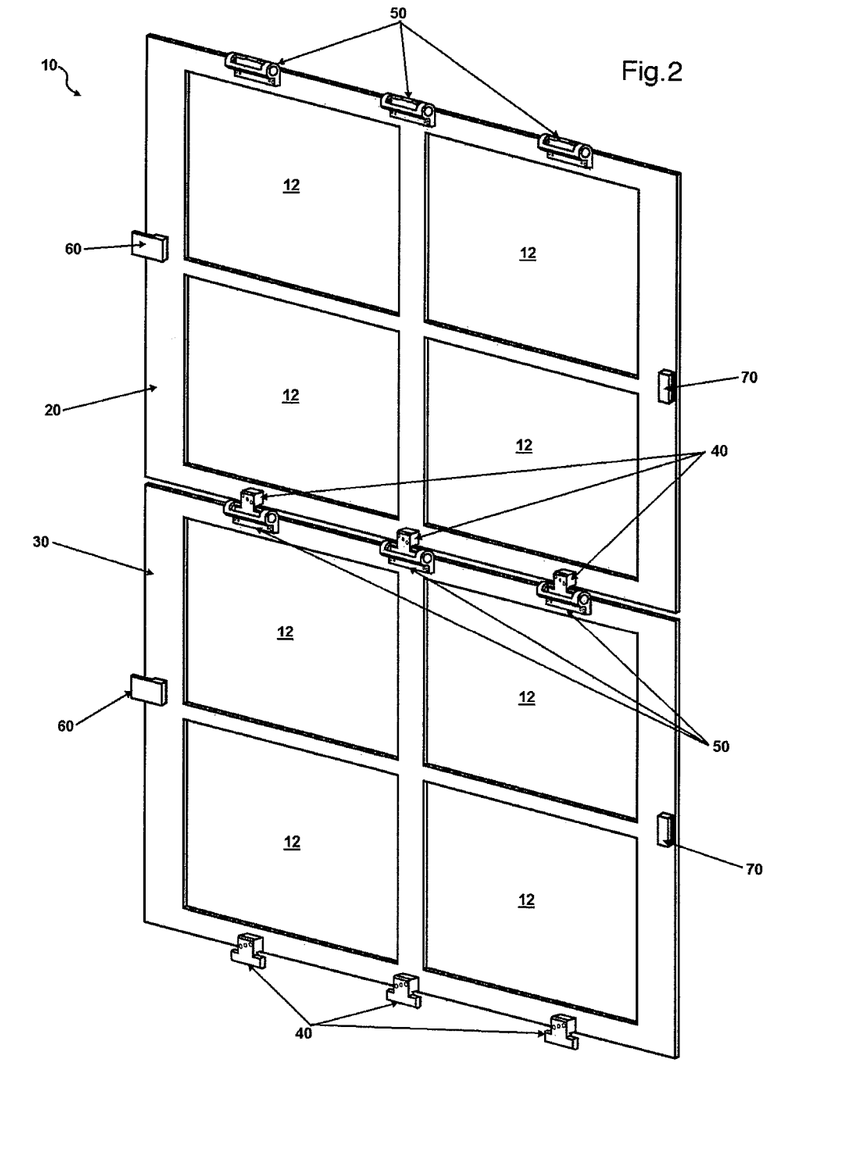
FIG. 2 shows a perspective view of the back of a tiled display mounting system.

FIG. 2 is a perspective view of the back of a tiled display mounting system 10 with displays removed. More specifically, extending hinge portions 40 have been inserted into receiving hinge portions 50 and first panel 20 and second panel 30 are linked together in a locked position (explained below with reference to FIGS. 3-7). A first connector 60 and second connector 70 are also shown. Holes 12 are sized and configured, by methods known in the art, to accommodate suitable displays.

First connector 60 and second connector 70 are used to align the first panel and second panel with other panels (not shown) to the left and right in the tiled display mounting system 10. In the illustrated embodiment, one connector is a "male" (shown as first connector 60) and the other is "female" (shown as second connector 70). In the preferred embodiment, the connectors 60, 70 are magnetic.

Figure 3:
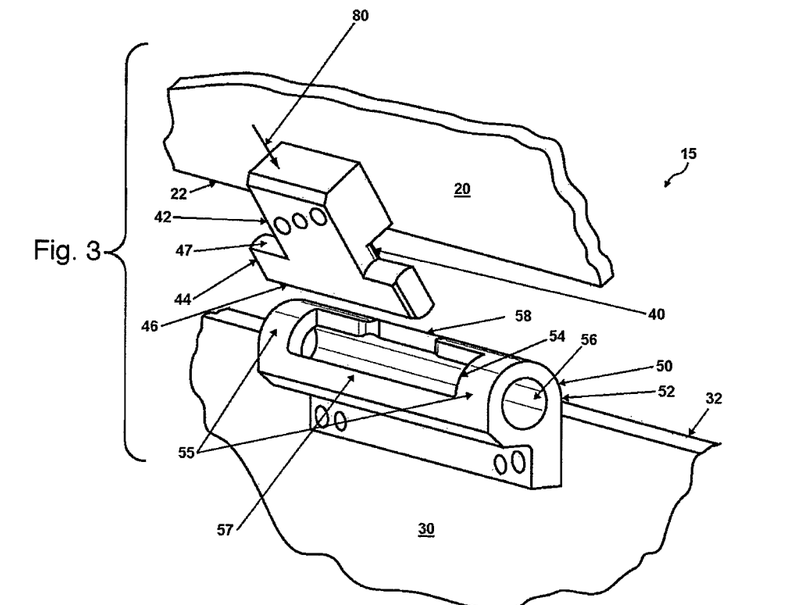
FIG. 3 shows a perspective view of a hinge for use in a tiled display mounting system prior to insertion.
Figure 4:
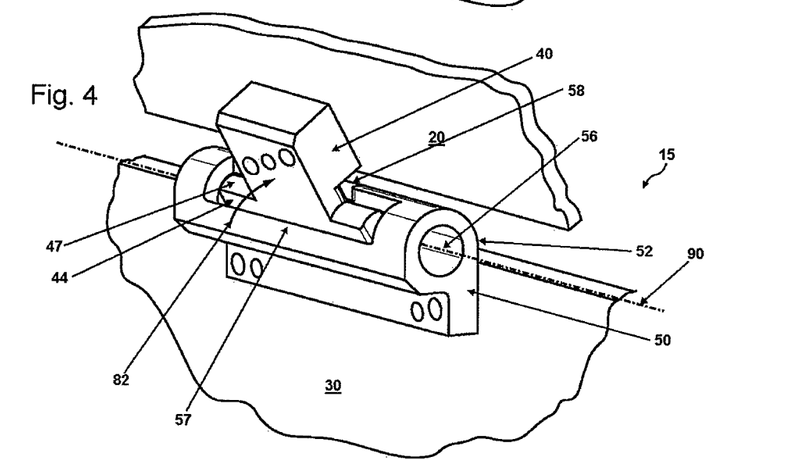
FIG. 4 shows a perspective view of a hinge for use in a tiled display mounting system the open position, after insertion but before rotation.
Figure 5:
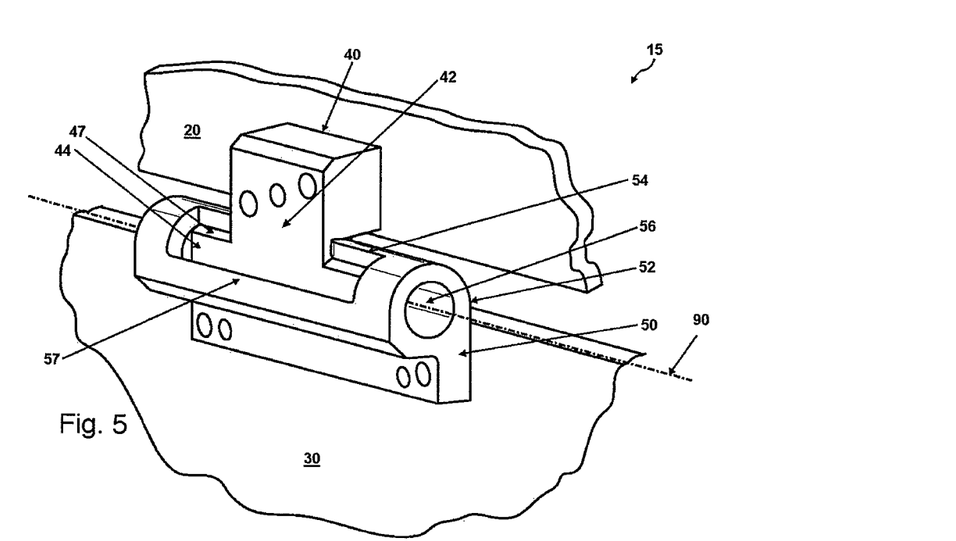
FIG. 5 shows a perspective view of a hinge for use in a tiled display mounting system in the locked position, after rotation.
Figure 6:
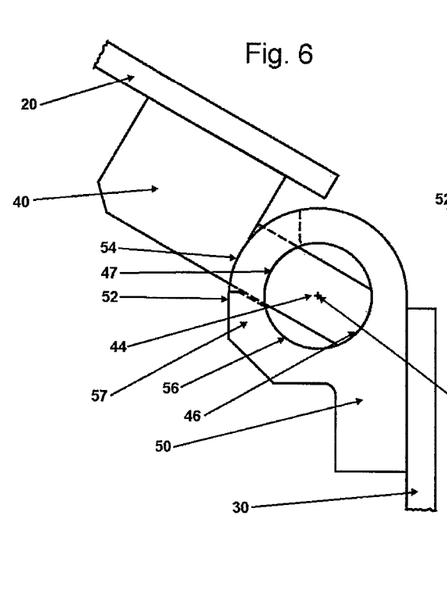
FIG. 6 shows a side view of a hinge for use in a tiled display mounting system the open position, after insertion but before rotation.
Figure 7:
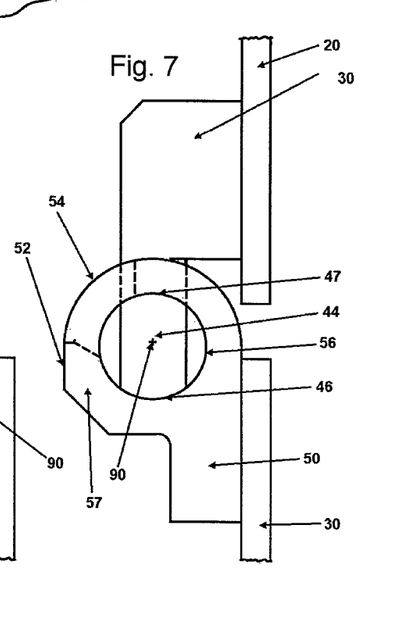
FIG. 7 shows a side view of a hinge for use in a tiled display mounting system the locked position, after rotation.

FIGS. 3-7 are perspective views of a hinge 15 for use in a tiled display mounting system 10 prior to insertion (FIG. 3), after insertion but before rotation (FIGS. 4 and 6), and in the locked position, after rotation (FIGS. 5 and 7).

Hinge 15 comprises an extending hinge portion 40 and a receiving hinge portion 50 attached, respectively, to the first panel 20 and the second panel 30. It should be noted that the drawings depict the extending hinge portion 40 attached to the "top" panel and the receiving hinge portion 50 attached to the "bottom" panel, but those skilled in the art will recognize that this configuration could be reversed.

The extending hinge portion 40 comprises a body potion 42 that extends outwards from an edge 22 of the first panel 20 in the direction of the second panel 30. A first bearing surface 46 is located on body portion 42. Preferably, at least one flange 44 extends perpendicularly from the body portion 42 in a direction parallel to the edge 22. First bearing surface 46 may form part of flange 44, as shown. Second bearing surface 47 is also shown as part of the at least one flange 44, although, those skilled in the art will recognize that alternative configurations of flanges and bearing surfaces are possible. The preferred embodiment (shown) comprises two flanges 44; each with a first and a second bearing surface 46, 47.

The receiving hinge portion 50 comprises a hollow cylindrical portion 52 attached proximate to an edge 32 of the second panel 30. The hollow cylindrical portion 52 includes a cut-out 54, through which the extending hinge portion 40 may be inserted. The interior surface of the hollow cylindrical portion 52 is third bearing surface 56.

In a preferred embodiment, cut-out-54 also includes a notch 58 to accommodate the body portion 42 of the extending hinge portion 40 when the hinge 15 is rotated into the locked position (explained below). Although not strictly necessary, the presence of notch 58 allows the second bearing surface 47 to engage with the third bearing surface 56. This provides additional options for setting up the tiled display mounting system since it permits the second panel 30 to be hung from the first panel 20 or the second panel 30 to support the weight of the first panel 20. An embodiment of the hinge 15 without notch 58 is limited to the configuration where the second panel 30 supports the first panel 20.

In another embodiment, the cut-out 54 may extend the full length of hollow cylindrical portion 52 (not shown). However, in another embodiment, at least one end portion 55 is provided to increase the structural strength of hollow cylindrical portion 52. In the preferred embodiment (shown) both end portions 55 remain.

In a preferred embodiment the cut-out 54 extends around the axis of rotation of hollow cylindrical portion 52 only far enough to accommodate the insertion of extending hinge portion 40. Ideally this is no more than 90 degrees, and preferably less than about 120 degrees. Greater structural integrity is achieved by removing only as much of hollow cylindrical portion 52 as necessary. Also, by keeping a lip 57 it is more difficult for the extending hinge portion 40 to accidentally fall out of the locked position if the tiled display mounting system 10 is bumped or otherwise disturbed. Rotation back to the open position is required before extending hinge portion 40 can be removed from receiving hinge portion 50.

Figure 8:
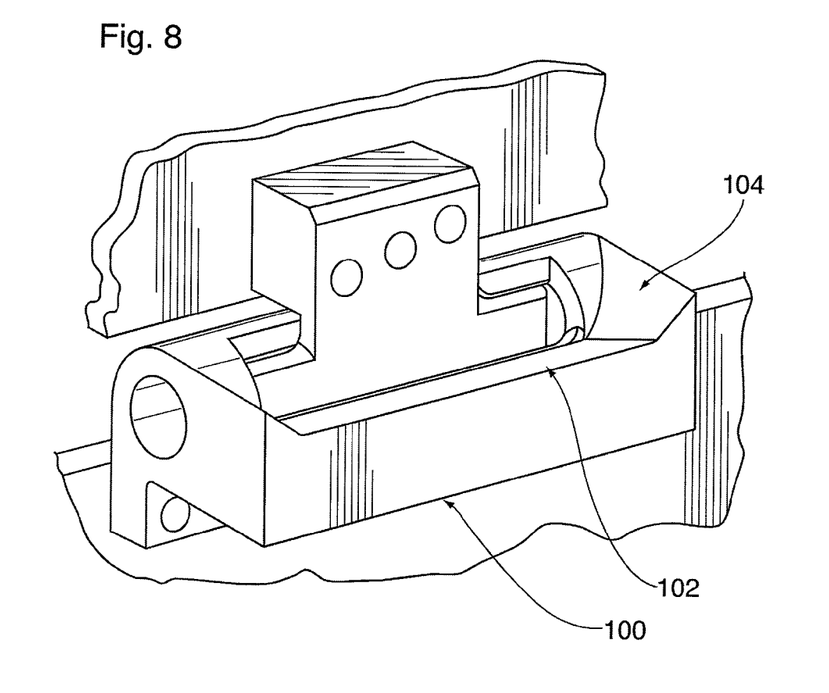
FIG. 8 shows a perspective view of a hinge for use in a tiled display mounting system incorporating a guide into the receiving hinge portion.

In another embodiment, shown in FIG. 8, a guide 100 may be incorporated into receiving hinge portion 50 to facilitate insertion of extending hinge portion 40. In a preferred embodiment, guide 100 comprises a sloping shelf 102 with contoured sidewalls 104 to guide extending hinge portion 40 into receiving hinge portion 50. Constructing the hinge 15 with a guide can allow the assembly of the tiled display 10 quickly and easily. In some cases, a worker may be able to insert the extending hinge portion 40 into the receiving hinge portion 50 entirely by "feel;" i.e. without needing a clear view of the hinge.

In operation, extending hinge portion 30 is inserted into the cut-out 54 in hollow cylinder portion 52 of receiving hinge portion 50 in the direction indicated by arrow 80 in FIG. 3. In this open position, as shown in FIGS. 4 and 6, first bearing surface 46 is in contact with third bear surface 56, but second bearing surface 47 is not in contact with third bearing surface 56. The extending hinge portion 40 may be removed with relative ease by pulling it back along the path of insertion.

Once in the open position, the extending hinge portion 40 and the receiving hinge portion 50 together define an axis of rotation indicated by stippled line 90 in FIGS. 4 and 5, and by a "+" symbol in FIGS. 6 and 7) about which the first panel 20 and/or the second panel 30 may be rotated. By rotating the first panel 20 relative to the second panel 30 in the direction of arrow 82 in FIG. 4, or vice versa (not shown), the hinge 15 is brought to the locked position as shown in FIGS. 5 and 7. In the locked position, first bearing surface 46 and second bearing surface 47 are in contact with third bearing surface 56. In the locked position the hinge 15 can be used to support the weight of first panel 20 provided second panel 30 is secure or to support the weight of second panel 30, provided first panel 20 is secure.

By attaching at least one extending hinge portion 40 and receiving hinge portion 50 to panels 20, 30 the displays 11 can be aligned relatively quickly and easily. The use of connectors 60 and 70 may be used to align the panels 20, 30 along another direction with adjacent panels. The hinges 15 and connectors 60, 70 provide an easy and fast way to set-up and align multiple panels 20, 30 of individual displays 11 on-site.

Figure 9:
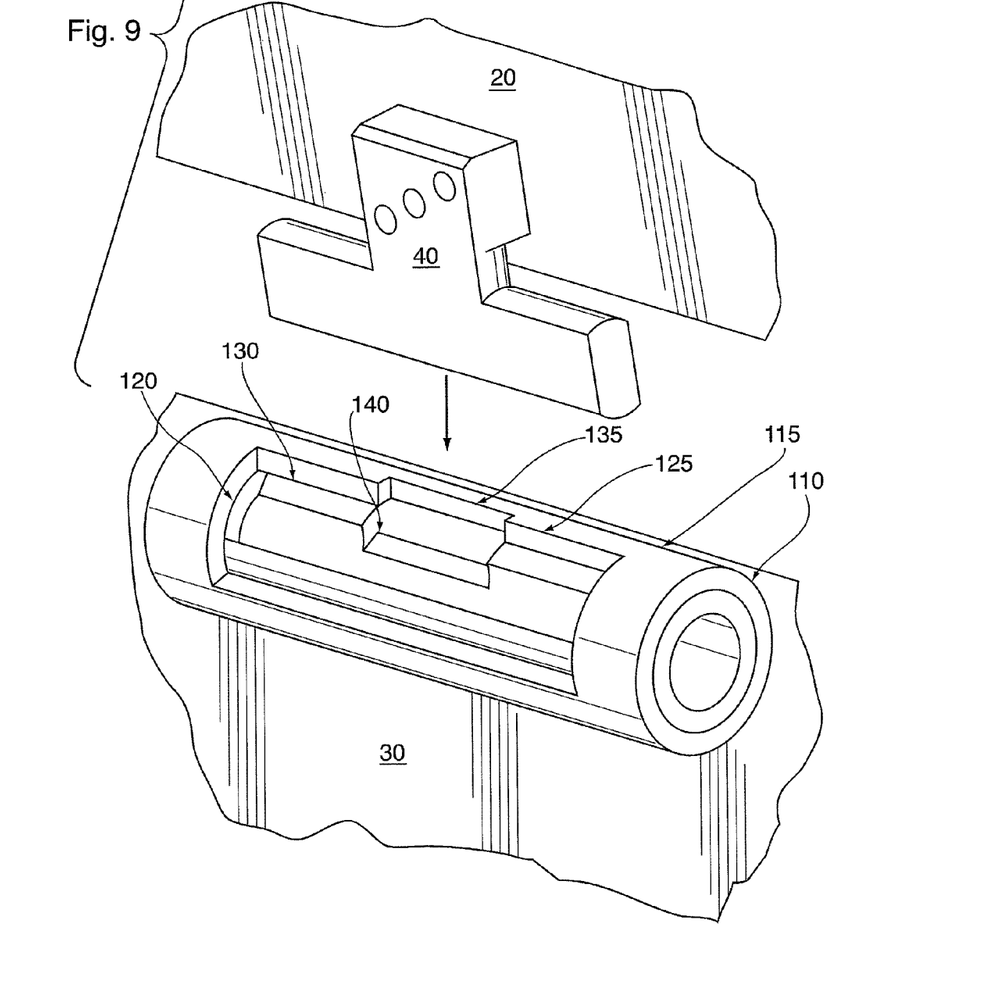
FIG. 9 shows a perspective view of another embodiment of a hinge for use in a tiled display mounting system, prior to insertion.
Figure 10:
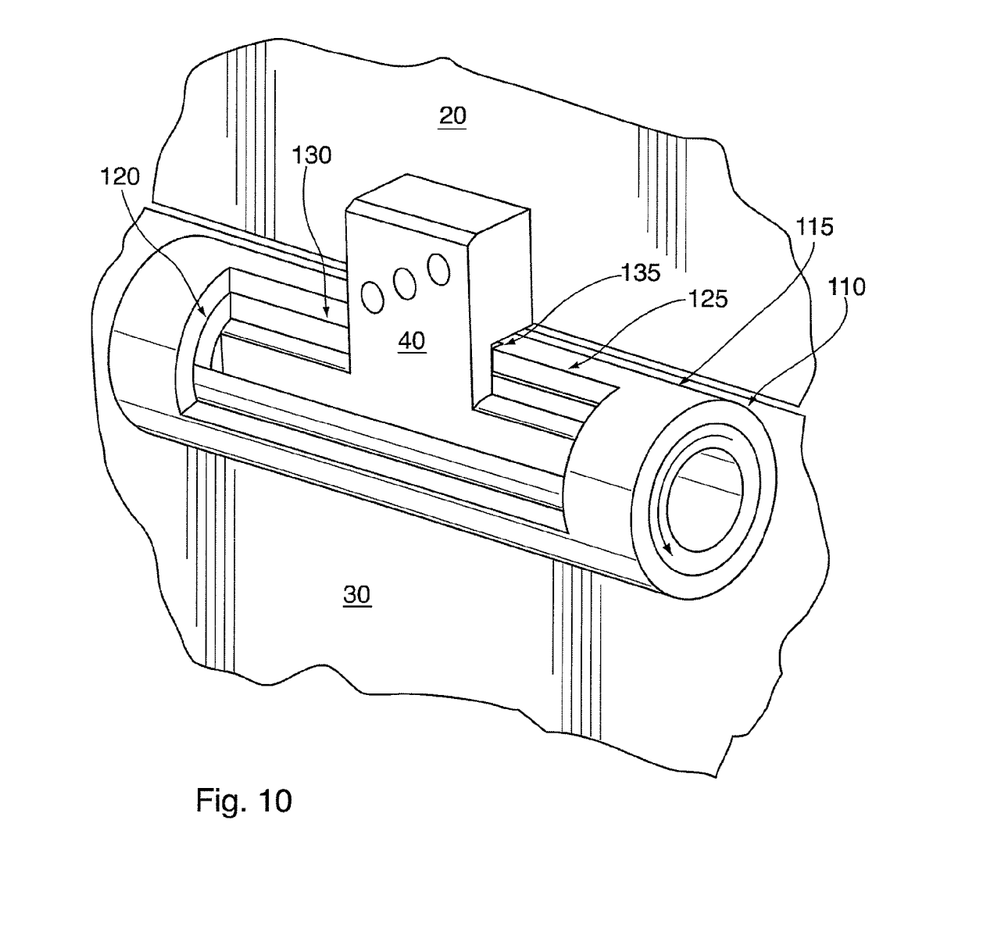
FIG. 10 shows a perspective view of the hinge shown in FIG. 9, after insertion but before rotation.
Figure 11:
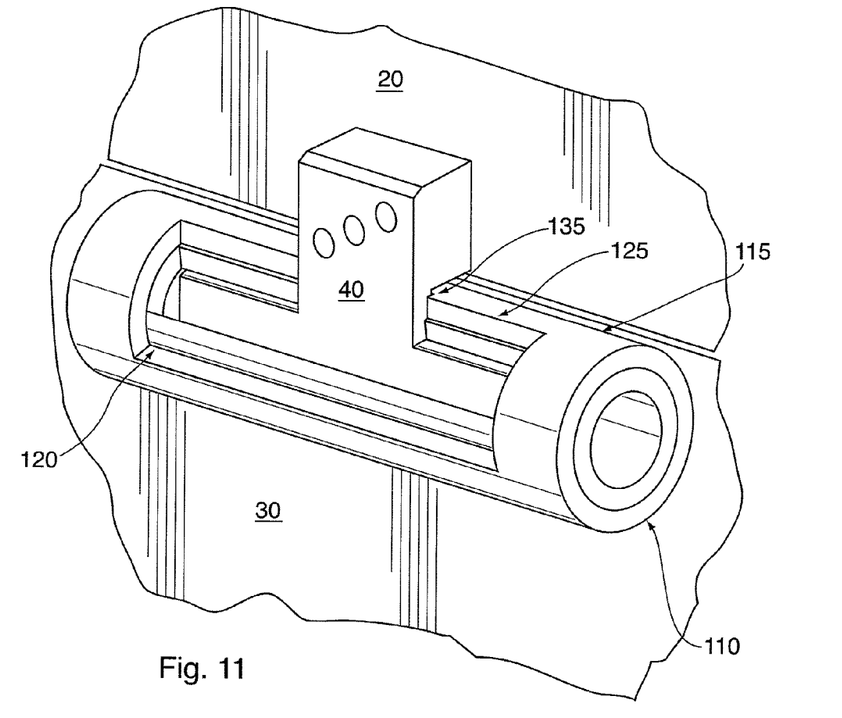
FIG. 11 shows a perspective view of the hinge shown in FIGS. 9 and 10, after rotation.

In another embodiment, shown in FIGS. 9-11, the rotation from the open position to the locked position can be accomplished using a rotational hinge portion 110 to receive the extending hinge portion, rather than the simpler receiving hinge portion that requires the rotation of an entire panel 20, 30.

In the preferred embodiment, the rotational hinge portion 110 comprises two concentric, hollow cylinders; an outer portion 115 and an inner portion 120. The outer portion 115 has an outer cut-out 125 while the inner portion 120 has in inner cut-out 130. When the inner cut-out 130 is aligned with the extending hinge portion 40, the extending hinge portion 40 can be inserted. FIG. 9 shows the extending hinge portion 40 and the rotational hinge portion 110 before insertion of the extending hinge portion 40. FIG. 10 shows the extending hinge portion 40 and the rotational hinge portion 110 in the open position, after Insertion of the extending hinge portion 40 but before rotation into the locked position.

After insertion of the extending hinge portion 40, the panel 20 is already substantially in its final position relative to panel 30. Rotation of the panel is not required. Instead, inner portion 120 can be rotated to reach the locked position. FIG. 11 shows the extending hinge portion 40 and the rotational hinge portion 110 in the locked position, after rotation.

Outer notch 135 and inner notch 140 can also be included in order to assist with alignment of panels 20, 30 and to allow extending hinge portion 40 to be more snuggly held within rotational hinge portion 110.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A tiled display mounting system comprising:
a first panel having a first edge and configured to mount at least one display tile of a tiled display;
a second panel having a second edge and configured to mount at least one display tile of said tiled display;
at least one extending hinge portion attached to said first edge of said first panel, said extending hinge portion having at least one bearing surface;
at least one receiving hinge portion attached to said second edge of said second panel, said receiving hinge portion having at least one further bearing surface for engaging with said at least one bearing surface; and wherein said at least one extending hinge portion and said at least one receiving hinge portion are located along said respective first and second edges so that when said at least one bearing surface and said at least one further bearing surface are engaged said second panel one of either supports or is supported by said first panel, wherein said receiving hinge portion comprises a cut-out for receiving said extending hinge portion and said extending hinge portion and said receiving hinge portion define an open position and a locked position, said open position being when said extending hinge portion has been inserted into said receiving hinge portion and said locked position being reached by rotating one of said first panel and second panel about a common axis of rotation;

wherein said receiving hinge portion comprises a hollow cylindrical portion and at least one end portion to increase the structural strength of said hollow cylindrical portion, said hollow cylindrical portion including said cut-out through which said extending hinge portion is inserted and wherein said at least one further bearing surface comprises a rounded interior surface of said hollow cylindrical portion defining said axis of rotation;

wherein at least one of said first panel and said second panel further comprise a third edge with a first connector and a fourth edge with a second connector; and wherein one of said first connector and said second connector is female and the other of said first connector and said second connector is male.

2. The system of claim 1 wherein said cut-out extends no more than 120 degrees along the surface of said hollow cylindrical portion.

3. The system of claim 1 wherein said cut-out includes a notch for receiving said extending hinge portion and preventing said first panel and said second panel from shifting relative positions along said axis of rotation.

4. The system of claim 3 wherein said extending hinge portion comprises at least one flange and said at least one bearing surface is located on said at least one flange.

5. The system of claim 4 comprising an additional bearing surface located on said at least one flange, approximately opposite said at least one bearing surface, so that said additional bearing surface engages with said at least one further bearing surface of the receiving hinge portion when said hinge is in a locked position.

6. The system of claim 1 wherein said receiving hinge portion further comprises a guide attached to said hollow cylindrical portion, said guide configured to guide the insertion of said extending hinge portion into said receiving hinge portion.

7. The system of claim 1 wherein said first connector and said second connector are magnetic.

* * * * *